(12) United States Patent
Yako et al.

(10) Patent No.: US 7,517,936 B2
(45) Date of Patent: *Apr. 14, 2009

(54) CURABLE SEALANT COMPOSITION

(75) Inventors: Takayuki Yako, Kodaira (JP); Jason T. Poulton, Akron, OH (US); Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 10/552,122

(22) PCT Filed: Apr. 2, 2004

(86) PCT No.: PCT/US2004/010532

§ 371 (c)(1),
(2), (4) Date: Oct. 4, 2005

(87) PCT Pub. No.: WO2004/090060

PCT Pub. Date: Oct. 21, 2004

(65) Prior Publication Data

US 2006/0217489 A1    Sep. 28, 2006

Related U.S. Application Data

(63) Continuation of application No. 10/408,046, filed on Apr. 4, 2003, now Pat. No. 6,737,470.

(51) Int. Cl.
*C08C 19/25* (2006.01)
*C08F 36/04* (2006.01)
*C08L 9/00* (2006.01)

(52) U.S. Cl. ............... 525/342; 525/333.1; 525/333.2; 524/572

(58) Field of Classification Search ............... 525/342, 525/333.1, 333.2, 331.9; 524/572
See application file for complete search history.

(56) References Cited

U.S. PATENT DOCUMENTS

| 3,838,108 | A |   | 9/1974 | Hergenrother et al. |
| 4,397,994 | A |   | 8/1983 | Takeuchi et al. |
| 4,783,504 | A |   | 11/1988 | St. Clair et al. |
| 5,310,798 | A |   | 5/1994 | Lawson et al. |
| 5,336,726 | A | * | 8/1994 | DuBois ...................... 525/272 |
| 5,405,911 | A |   | 4/1995 | Handlin et al. |
| 5,521,255 | A |   | 5/1996 | Roy |
| 5,548,025 | A |   | 8/1996 | Bening |
| 6,737,470 | B1 | * | 5/2004 | Yako et al. .................. 524/588 |

FOREIGN PATENT DOCUMENTS

| EP | 0240044 | 10/1987 |
| EP | 0312967 | 4/1989 |
| EP | 0745613 | 12/1996 |
| EP | 1439194 | 7/2004 |

OTHER PUBLICATIONS

"A New Difunctional Anionic Initiator", R.P. Foss, H.W. Jacobson, and W.H. Sharkey, vol. 10, No. 2, Mar.-Apr. 1977, pp. 287-291.

"Studies on Dilithium Initiators. 3. Effect of Additives and Seeding", G. Y.-S. Lo, E. W. Otterbacher, A. L. Gatzke, and L.H. Tung, Macromolecules 1994, 27, pp. 2233-2240.

Efficiency of the sec-Butyllithium/m-Diisopropenylbenzene Diadduct as an Anionic Polymerization Initiator in Apolar Solvents, Y.S. Yu, Jerome, R. Fayt, and Ph. Teyssie, Macromolecules 1994, 27, pp. 5957-5963.

Studies on Dilithium Initiators. 1. Hydrocarbon-Soluble Initiators 1, 3-Phenylenebis(3-methyl-1-phenylpentylidene)dilithium and 1,3-Phenylenebis[3-methyl-1-(methylphenyl)pentylidene]dilithium, pp. 2219-2224, Tung et al., Macromolecules 27 (1994).

Jun. 20, 2008 Office Action from U.S. Appl. No. 11/795,487, filed Sep. 18, 2007 [9 pp.].

* cited by examiner

*Primary Examiner*—Roberto Rábago
(74) *Attorney, Agent, or Firm*—Nathan Lewis; Meredith E. Hooker

(57) ABSTRACT

A curable sealant composition is provided. The composition includes a polymer including at least conjugated diene contributed monomer units in a backbone of the polymer and terminal groups including silicon. The composition also includes additional sealant ingredients selected from the group consisting of plasticizers, filler, reinforcing agents, modifiers, curing catalysts/hardeners, stabilizers, and mixtures thereof.

17 Claims, No Drawings

CURABLE SEALANT COMPOSITION

This application is the National Stage of International Application No. PCT/US2004/010532, filed Apr. 2, 2004, which is a continuation of U.S. application Ser. No. 10/408,046, filed Apr. 4, 2003, now U.S. Pat. No. 6,737,470.

BACKGROUND OF THE INVENTION

The present invention is generally directed to a curable sealant composition. It is more specifically directed to a poly (conjugated diene) curable sealant composition.

Polymers, such as polyisobutylene, have found applications in building sealants due to inherent moisture impermeability. To function as a sealant, a curable group is usually combined with the isobutylene units, resulting in, for example, alkoxy-silane functionalized polyisobutylene. Current polyisobutylene building sealants are often formed using a two-step process. The polymer backbone is formed and endcapped with a reactive functional group. The reactive functional group is then reacted, often in the presence of a metal catalyst, resulting in the presence of a curable group on the polymer backbone. In one specific example, the polymer is endcapped with allyl groups through the use of allyltrimethylsilane. Then, the allyl group is hydrosilylated using a platinum catalyst and an appropriate silane. In another method, the reactive functional groups are dispersed throughout the polymer backbone, followed by the reaction of the functional groups to form curable siloxane groups within the polymer backbone. This two-step process is both expensive and cumbersome.

Accordingly, polyisobutylene-based sealants may suffer from several drawbacks. Moreover, such sealants are (i) often expensive to prepare and (ii) strongly influenced by the relatively high cost of isobutylene monomer. Furthermore, they are often limited to use as a two-part building sealant, requiring combination of the sealant with a catalyst immediately prior to use. If the catalyst is added to the sealant too soon, premature curing may occur, resulting in difficult, and inconsistent, application of the sealant. The requirement for end-user mixing may also result in inconsistencies in the building sealants due to carelessness on the part of the end-user.

It would be desirable to have available a less expensive, more efficient process to directly prepare alkoxysilane functionalized sealant compositions with low polydispersity.

SUMMARY OF THE INVENTION

In one embodiment of the present invention, a curable sealant composition is provided. The composition includes a polymer including at least conjugated diene contributed monomer units in a backbone of the polymer and terminal groups including silicon. The composition further includes additional curable sealant ingredients selected from the group consisting of plasticizers, fillers, reinforcing agents, modifiers, curing catalysts/hardeners, stabilizers, and mixtures thereof.

In a second embodiment of the present invention, a process for forming a curable sealant is provided. The process comprises initiating a living polymerization of conjugated diene monomer units with a multifunctional substituted initiator, and terminating the polymerization with a tetra-substituted silicon group.

In another embodiment of the present invention, a curable sealant is provided. The curable sealant includes a poly(conjugated diene) backbone having a $M_w$ between about 5,000 and 60,000, and at least one alkoxysilane end group. The composition further includes additional curable sealant ingredients selected from the group consisting of plasticizers, fillers, reinforcing agents, modifiers, curing catalysts/hardeners, stabilizers, and mixtures thereof

DETAILED DESCRIPTION OF ILLUSTRATIVE EMBODIMENTS

The present invention is directed to a curable sealant comprised of polymers with conjugated diene monomer units and curing groups. The curing groups may be terminal groups, resulting in a telechelic polymer composition. The polymer compositions of the present invention preferably have a polydispersity ratio less than about 1.8, more preferably less than about 1.7, and most preferably less than about 1.6. The polydispersity ratio is represented by the ratio of $M_w$ to $M_n$, with a ratio of about one representing a composition that is substantially monodisperse. If the polydispersity is too high, the resultant sealants may demonstrate poor tensile properties and poor workability. "Workability" refers to the rate at which the viscosity of the sealant increases as it begins to cure.

The polymer composition of the present invention includes a polymer backbone with monomer units selected from the group consisting of $C_4$-$C_8$ conjugated dienes, and mixtures thereof. Preferred conjugated dienes include 1,3-butadiene, isoprene, 1,3-pentadiene, 2, 3-dimethyl-1,3-butadiene, 1,3-hexadiene, 2-methyl-1,3-pentadiene, 3,4-dimethyl-1,3-hexadiene 4,5-diethyl-1,3-octadiene, 3-butyl-1,3-octadiene, phenyl-1,3-butadiene, and mixtures thereof. An especially preferred conjugated diene is 1,3-butadiene.

The conjugated diene backbone preferably has a weight average molecular weight ($M_w$) between about 5,000 and 60,000, more preferably between about 10,000 and 35,000. While the backbone is preferably linear, it may be crosslinked to form branched structures.

The polymer composition may also include additional monomer units in the polymer backbone. Suitable additional monomer units may include vinyl aromatic hydrocarbon monomers, ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isbutyrthioaldehyde, n-caprothioaldehyde, 3-dimethyl-oxycyclobutane, 3-diethyloxycyclobutane, 3-methylethyl-oxycyclobutane, 3 -diemethylthiocycylobutane, 3-diethyl-thiocyclobutane, 3-methylethylthiocyclobutane, methylethyl thioketone, methyl isopropyl thioketone and diethyl thioketone, heterocyclic nitrogen containing monomers, and mixtures thereof. Exemplary vinyl aromatic hydrocarbon monomers for use in the present invention include one or more of styrene, α-methyl styrene, 1 -vinyl naphthalene, 2-vinyl naphthalene, 1-α-methyl vinyl naphthalene, 2α-methyl vinyl naphthalene, as well as alkyl, cycloalkyl, aryl, alkaryl, and aralkyl derivatives thereof, in which the total number of carbon atoms in the combined hydrocarbon is not greater than about 18, and mixtures thereof. Exemplary heterocyclic nitrogen containing monomers include pyridine and quinoline derivatives containing at least 1 vinyl or alphamethylvinyl group such as 2 -vinylpyridine, 3-vinylpyridine, 4-vinylpyridine, 3-ethyl-5-vinylpyridine, 3-methyl-5 -vinylpyridine, 3,5-diethyl-4-vinylpyridine and similar mono- and di-substituted alkenyl pyridines and like quinolines such as 2-vinylquinoline, 3-vinylquinoline, 4-vinylquinoline and mixtures thereof.

In the event additional monomer units are employed, the polymer composition preferably includes between about 1 and 99 wt % conjugated diene contributed monomer units, more preferably between about 50 and 99 wt %, and most preferably between about 70 and 99 wt %. The polymer composition further preferably includes between about 1 and 99 wt % additional contributed monomer units, e.g., vinyl aromatic hydrocarbon, more preferably between about 1and 50 wt %, most preferably between about 1 and 30 wt %.

The sealant can be formed by any polymerization technique known to the skilled artisan. Preferably, the polymerization is initiated via addition of anionic initiators that are known in the art as useful in the polymerization of diene monomers and/or copolymerization of diene monomers and vinyl aromatic hydrocarbons. A multi-functionalized lithium initiator may be used to initiate the preferred living polymerization reaction. Lithium initiators with two or more active initiation sites will initiate a living polymerization with at least two living polymerization sites on each living polymer chain. The polymer backbone may have an initiator residue derived from the multi- or di-functional lithium initiator remaining at the initiation site. Especially preferred initiators include 1,3-bis(1-lithio-1,3-dimethylpentyl)benzene, 1,3-phenylenebis(3-methyl-1-phenylpentylidene)dilithium, 1,3-phyenylenebis[3-methyl-1(methylphenyl)pentylidene]dilithium, initiators derived from reaction of two molar equivalents of sec-butyllithium with 1,3-diisopropenylbenzene 1,3-di(1-phenylethenyl)benzene, 1,3-di[1-(methylphenyl)ethenyl)]benzene, bis[4-(1-phenylethenyl)phenyl]ether, 1,4-bis(1-phenylethenyl)-1,1'-biphenyl, and 2,2'-bis[4-(1-phenylethenyl)phenyl]propane, and mixtures thereof.

The polymerization is preferably carried out at moderate temperatures, such as those between about 23° C. and about 70° C., and most preferably between about 40° C. and 60° C., under an inert atmosphere, such as $N_2$ or Ar. The initiator, conjugated diene monomer, and any additional monomer that may be included, are added to a polymerization vessel, and polymerization is initiated. Living polymerization is a preferred polymerization method, although other polymerization techniques known in the art are contemplated. The initiator is added in an amount of about 0.001 to 0.1 mol initiator per 100 grams conjugated diene, more preferably between about 0.0017 and 0.02 mol initiator per 100 grams conjugated diene monomer, most preferably between about 0.0029 and 0.01 mole per 100 grams conjugated diene monomer. The polymerization is allowed to continue until substantially 100% of monomer conversion has been achieved.

The polymerization can be terminated by the addition of tetra-substituted silicon group. A preferred terminator is of the general formula:

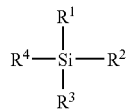

wherein $R^1$, $R^2$, $R^3$, and $R^4$ are independently selected from the group consisting of hydrocarbon, alkoxy groups and mixtures thereof. No more than three of $R^1$, $R^2$, $R^3$, and $R^4$ may be hydrocarbon. At least one of $R^1$, $R^2$, $R^3$, and $R^4$ is preferably an alkoxy group. Suitable alkoxy groups include methoxy, ethoxy, propoxy, butoxy, pentoxy, alkoxy groups with up to about 10 carbons, and mixtures thereof. Suitable hydrocarbon groups include methyl, ethyl, propyl, butyl, pentyl-, hexyl-, heptyl-, octyl-, nonyl-, decyl-, and mixtures thereof. Hydrocarbon groups may be linear or branched, and are preferably saturated. At least one of $R^1$, $R^2$, $R^3$, or $R^4$ should be capable of terminating the living polymerization of conjugated diene monomers.

A 1,2-microstructure controlling agent or randomizing modifier is optionally used to control the 1,2-microstructure in the conjugated diene contributed monomer units, such as 1,3-butadiene, of the polymer composition. Suitable modifiers include hexamethylphosphoric acid triamide, N,N,N', N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane.

A mixture of one or more randomizing modifiers can also be used. The ratio of the modifier to the monomers can vary from a minimum as low as about 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the polymer backbone. The 1,2-microstructure content of the conjugated diene units is preferably between about 10 and 90%, more preferably between about 40 and 70%.

The polymer composition will preferably have a room temperature (about 23° C.) viscosity between about 10 poise and 200 poise, more preferably between about 20 poise and 70 poise.

It may be desirable to include additional additives known in the art to the present curable sealant composition.

For example, hardeners (also known as curing catalysts), plasticizers, fillers, stabilizers, other miscellaneous ingredients known in the art, and mixtures thereof may preferably be added in an amount between about 60 and 80 wt % of the total composition. Exemplary hardeners/curing catalysts include for instance, a titanate such as tetrabutyl titanate or tetrapropyl titanate; an organotin compound such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine or 1,3-diazabicyclo-(5,4,6)undecene-7(DBU), and its salt with a carboxylic acid or the like; a polyamide having a low molecular weight obtained by the reaction of an excess polyamine with a polybasic acid; a reaction product of an excess polyamine with an epoxy compound; and a silane couping agent having an amino group, e.g. a silanol condensation catalyst such as γ-aminopropyltrimethoxysilane or N-(beta-aminoethyl)aminopropyl-methyl-dimethoxysilane; and the like. The curing catalysts may be employed alone or as an admixture thereof.

Exemplary plasticizers include, for instance, a hydrocarbon oil such as an alkyl diphenyl or a partially hydrogenated terphenyl; chlorinated paraffin or a phthalic acid ester such as dibutyl phthalate, diheptyl phthalate, di-(2-ethylhexyl)phthalate, butylbenzyl phthalate or butylphthalylbutyl glycolate; a non-aromatic dibasic acid ester such as dioctyl adipate or dioctyl sebacate; an ester of polyalkylene glycol such as diethylene glycol dibenzoate or triethylene glycol dibenzoate; a phosphoric acid ester such as tricresyl phosphate or tributyl phosphate; and the like, and mixtures thereof. The plasticizers are used alone or as an admixture thereof. It is possible to admix the plasticizers at the time when preparing the organic polymer. Plasticizers typically constitute between about 10% to 40% of the total composition As the modifier, various silane coupling agents are used, as occasion demands. Examples of the silane coupling agents are, for instance, alkylalkoxysilanes such as methyltrimethoxysilane, dimethyldimethoxysilane such as dimethyldiisopropenoxysilane, methltriisopropenoxysilane and γ-glycidoxypropylmethyldiisopropenoxysilane; alkoxysilanes having a functional group such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(beta-aminoethyl)aminopropylmethyldimethoxysilane, γ-mercapto-propyltrimethoxysilane and γ-mercaptopropylmethyldimethoxysilane; silicone varnish; polysiloxanes; and mixtures thereof. By employing the above-mentioned modifiers, it is possible to increase the hardness of the cured product or to decrease the hardness to give better elongation property. Modifiers typically constitute about 0.5% to 2% of the total composition Examples of fillers and reinforcing agents are, for instance, heavy or light calcium carbonate; calcium carbonate the surface of which is treated with a fatty acid, a resin acid, a cationic surface active agent, or an anionic surface active agent; magnecium carbonate, talc, titanium oxide, barium sulfate, alumina, metal powder such as aluminum powder, zinc powder or iron powder, bentonite, kaoline clay, fumed silica, quartz powder, carbon black and mixtures thereof. The fillers or reinforcing agents are employed alone or as an admixture thereof. When using the filler or the reinforcing agent capable of giving transparency to the composition such as fumed silica, sealing compositions having excellent transparency can be obtained. Fillers and/or reinforcing agents typically constitute between about 20% and 50% of the total composition.

Examples of typical stabilizers known in the art are antioxidants, radical chain terminators, ultraviolet absorbers, sequestrants, ozone degradation inhibitors, light stabilizers, and phosphorus type peroxide decomposers and mixtures thereof. Stabilizers typically constitute between about 0.5% and 2% of the total composition.

Examples of miscellaneous ingredients known in the art include, but are not limited to, lubricants, pigments, blowing agents, photocurable resins, thixotropic agents and mixtures thereof. Miscellaneous ingredients typically constitute about 0.5% to 2% of the total composition.

Although the curable composition of the present invention itself has good adhesion to glass, ceramics or metals, the composition of the invention can be widely adhered to various materials by employing primers. The adhesion property of the curable composition to various materials can be further improved by incorporation of adhesion accelerators such as epoxy resins, phenol resins, various silane coupling agents, alkyltitanates or aromatic polyisocyanates. The accelerators may be used alone or as an admixture thereof.

The curable polymer composition formed in accordance with the present invention is suitable for use as a one-part building sealant. The resultant sealant may be applied at building sites to prevent moisture permeation. The alkoxysilane groups of the polymer composition form crosslinks upon exposure to moisture, resulting in cured building sealants. Cure times of between about 1 day and 7 days may be achieved by exposing the polymers to moisture in the air.

The present invention now will be described with reference to non-limiting examples. The following examples and tables are presented for purposes of illustration only and are not to be construed in a limiting sense.

EXAMPLES

A dried 28 oz (795 mL) or 7 oz (199 mL) glass bottle, which previously had been sealed with extracted septum liners and perforated crown caps under a positive nitrogen purge, was used for all of the preparations. Butadiene in hexane (21.9 weight percent butadiene blend B-31), cyclic oligomeric, oxolanyl modifier (abbreviated as OOPS, 1.6 M solution in hexane, stored over calcium hydride), and 2,6-di-tert-butylphenol (abbreviated as BHT, solution in hexane) were used as supplied. BHT is used as an antioxidant. Commercially available reagents (Aldrich Chem. Co. or Fisher Scientific) include the following: 1,3-diisopropenyl-benzene (distilled from calcium hydride and stored over calcium hydride), sec-Butyllithium (1.3 M solution in cyclohexane), lithium isopropoxide (1.0 M solution in hexanes), methyltrimethoxysilane, octyltrimethoxysilane, methyltriethoxysilane tetraethyl orthosilicate, 2-ethylhexanoic acid (abbreviated as EHA), and sorbitan trioleate (abbreviated as STO, dried over molecular sieves).

Example 1

To a solution of 1,3-diisopropenylbenzene (2.57 mL, 15 mmol) and triethylamine (4.18mL, 30 mmol) was added sec-BuLi (23.1 mL, 1.3 M in cyclohexane) via a syringe at room temperature. The solution was agitated and heated at 50° C. for 2 hr. The deep red Li diadduct (abbreviated as DiLi 0.5 M) solution was used as an initiator for polymerizing butadiene.

Example 2

The bottle was charged with 163 g of hexane, 137 g of butadiene blend B-31, 2.5 mL of DiLi (from Example 1) by syringe, then 0.15 mL of OOPS solution (1.6 M, in hexane). The bottle was agitated and heated at 50° C. for 1.5 hr. Then 4.2 mL of tetraethyl orthosilicate solution (abbreviated as TEOS, 0.5M, in hexane) was introduced by syringe to the living polymer cement and agitated and heated at 50° C. for an additional period of 10 min. To the mixture was added 4 mL of BHT solution, 2.25 mL of 2-ethylhexanoic acid solution (EHA, 1.0 M in hexane), and 18 mL of paraffin oil (abbreviated as PAO). The solvent was removed under house-vacuum, and the residue is recovered.

Example 3

The bottle was charged with 163 g of hexane, 137 g of butadiene blend B-31, then 2.5 mL of DiLi by syringe, then 0.15 mL of OOPS solution (1.6 M, in hexane). The bottle was agitated and heated at 50° C. for 1.5 hr. Then, 4.2 mL of octyltrimethoxysilane solution (abbreviated as OTMOS, 0.5M, in hexane) was introduced by syringe to the living polymer cement and agitated and heated at 50° C. for an additional period of 10 min. To the mixture was added 4 mL of BHT solution, 4.5 mL of sorbitan trioleate (STO, 1M, neat), and 18 mL of PAO. The solvent was removed under house-vacuum, and the residue is recovered.

Example 4

The preparation and the procedure used in Example 3 was repeated, but without adding sorbitan trioleate (STO).

Example 5

The preparation and the procedure used in Example 2 was repeated, but adding sorbitan trioleate (STO) instead of 2-ethylhexanoic acid solution (EHA).

Example 6

1.223 kg of hexane and 2.809 kg of 21.8 wt % butadiene in hexane (B-39) were added to two gallons $N_2$ purged reactor equipped with a stirrer. The reactor was charged with 81.6 ml of DiLi (0.5 M, prepared by the same procedures as Example 1) and 5.1 ml of OOPS (1.6 M solution in hexane), and the reactor jacket was heated to 50° C. After 26 minutes, the batch temperature peaked at 68° C. After an additional 15 minutes, the live cement was terminated with 22.5 ml of tetraethyl orthosilicate (4.48 M) in 30 ml of hexane, and polymer was removed from the reactor into the dried 28-oz glass bottles. The polymers had the following properties: $M_n=31.4\times10^3$ g/mol, $M_w=69.1\times10^3$ g/mol, polydispersity=2.20, % coupling=70.6.

Example 7

1.223 kg of hexane, and 2.809 kg of 21.8 wt % butadiene in hexane (B-39) were added to two gallons $N_2$ purged reactor equipped with a stirrer. The reactor was charged 49 ml of DiLi (0.5 M, prepared by the same procedures as Example 1.) and 4.1 ml of OOPS (1.6 M solution in hexane), and the reactor jacket was heated to 50° C. After 18 minutes, the batch temperature peaked at 81.5° C. After an additional 15 minutes, the live cement was terminated with 7.9 mL of methyltrimethoxysilane (6.97 M) in 20 ml of hexane, and the polymer was removed from the reactor into the dried 28-oz glass bottles. The polymers gave the following properties: $M_n=34.8\times10^3$ g/mol, $M_w=49.9\times10^3$ g/mol, polydispersity=1.43, % coupling=48.

Application in Sealants

Examples 8-13

Six kinds of sealant compositions were prepared according to the formulations and procedures shown in Table 1-3. The compositions (polymer, calcium carbonate) were mixed by planetary mixer for 30 minutes. Plasticizer was then added to the mixer and the pressure reduced to 0.1 Pa. The samples were mixed for an additional 30 minutes after addition of plasticizer.

Measurements of tensile strength and cure stability on the cured rubber compounds gave the results shown in Table 4. Measurements of tensile strength is based on conditions of JIS A 5758.

While it may be true that conjugated diene sealants have slightly faster degradation rates than polyisobutylene sealants, as can be seen in Table 4 the rubber compositions of Examples 9-13 exhibited very well balanced physical properties. Tensile strength is better than that of the control compound (Example 8) which is a commercially available sealant material. The cure stability of Examples 10-13 (with added EHA or STO) is better than that of Example 9, which has no added stabilizer. Example 13 also demonstrates the excellent properties that these polymers show when used as a one-part sealant.

TABLE 1

Composition for 2-part sealant

Base

| | | |
|---|---|---|
| 1 | Polymer | 100 phr |
| 2 | Calcium Carbonate (CCR-B) | 120 phr |
| 3 | Calcium Carbonate (Softon 3200) | 26 phr |
| 4 | Plasticizer (PAO5004) | 140 phr |

Hardener

| | | |
|---|---|---|
| 1 | Di-octyl tin | 2.0 phr |
| 2 | Lauryl amine | 0.4 phr |
| 3 | Calcium Carbonate (Softon 3200) | 5 phr |
| 4 | Plasticizer (PAO5004) | 6 phr |

TABLE 2

Composition for 1-part sealant

| | | |
|---|---|---|
| 1 | Polymer | 100 phr |
| 2 | Calcium Carbonate (CCR-B) | 120 phr |
| 3 | Calcium Carbonate (Soften 3200) | 36 phr |
| 4 | $TiO_2$ | 2 phr |
| 5 | Plasticizer (PAO5004) | 150 phr |
| 6 | Vinyl trimethoxysilane | 1.5 phr |
| 7 | Di-octyl tin | 2.0 phr |
| 8 | Lauryl amine | 0.4 phr |

TABLE 3

Mixing Conditions 2 part sealant

Mixer: 2 L planetary mixer  Agitation Speed: 40 rpm
Initial Temperature: 30° C.

| | Procedure |
|---|---|
| 0 min | Add components 1-3 |
| 30 min | Add component 4, reduce pressure to 0.1 Pa |
| 60 min | End |

1 part sealant

Mixer: 2 L planetary mixer  Agitation Speed: 40 rpm
Initial Temperature: 30° C.

| | Procedure |
|---|---|
| 0 min | Add components 1-4 |
| 30 min | Add component 5, reduce pressure to 0.1 Pa |
| 90 min | Add component 6 |
| 120 min | Add components 7-8 |
| 130 min | End |

TABLE 4

Physical properties

| | Example 8 | Example 9 | Example 10 | Example 11 | Example 12 | Example 13 |
|---|---|---|---|---|---|---|
| 1-part or 2-part | 2-part | 2-part | 2-part | 2-part | 2-part | 1-part |
| $M_n$ | | 33.2K | 40.1K | 34.7K | 32K | 40.1K |
| $M_w$ | | 44.8K | 61.9K | 49.8K | 45K | 61.9K |

TABLE 4-continued

| | Physical properties | | | | | |
|---|---|---|---|---|---|---|
| | Example 8 | Example 9 | Example 10 | Example 11 | Example 12 | Example 13 |
| PDI | | 1.34 | 1.54 | 1.43 | 1.41 | 1.54 |
| OOPS/Li | | 0.16/1.0 | 0.16/1.0 | 0.16/1.0 | 0.16/1 | 0.16/1.0 |
| Terminator | | OTMOS | TEOS | OTMOS | TEOS | TEOS |
| Terminator, M | | 0.5 | 0.5 | 0.5 | 0.5 | 0.5 |
| % coupling | | 50.4 | 61.5 | 57.7 | 55.03 | 61.5 |
| Stabilizer | | — | EHA | STO | STO | EHA |
| Stabilizer/"Li" | | — | 1.5/1.0 | 1.5/1.0 | 4.0/1.0 | 1.5/1.0 |
| Stability | ± | Δ!Ξ | ± | ± | ± | ± |
| 50% M [N/cm2] | 6 | 10.5 | 15.1 | 7.5 | 11.4 | 10.6 |
| Tb [N/cm2] | 19.5 | 37.7 | 45.3 | 26 | 33 | 36.8 |
| Eb [%] | 310 | 462 | 213 | 438 | 191 | 256 |

Stability:
±: No cure without hardener.
Δ: Gradually cure without hardener

Table 5 illustrates the merit of polybutadiene based sealant properties as compared to other polymers commonly used in the sealant industry such as silicone rubber (SR), polyisobutylene (PIB), modified silyl polypropylene glycol (MS-PPG), polysulfide (PS) and polyurethane (PU). In the table below, a ranking of "A" is most desirable and "C" is least desirable. The major advantages of this polymer compared to other common polymers used in sealant applications are improved staining, potentially lower cost and potential for use in one part sealant formulations.

| | Sealant properties | | | | | |
|---|---|---|---|---|---|---|
| | PBd | SR | PIB | MS-PPG | PS | PU |
| Durability | B | A | A | B | B | C |
| Water-resistance | A | A | A | A | B | C |
| Heat-resistance | A | A | A | A | B | C |
| Staining | A | C | B | B | A | C |
| Cost | A | C | C | B | B | A |
| 1-part | Possible | Possible | Impossible | Possible | Possible | Possible |
| Temperature dependency | A (Little) | A | B | B | B | B |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A curable sealant composition comprising the reaction product of:
   a) a polymer comprising conjugated diene monomer units in a backbone of said polymer, and
   b) a silicon containing functional group of the structure:

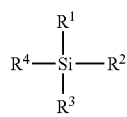

wherein $R^1$, $R^2$, $R^3$, and $R^4$ are independently selected from the group consisting of hydrocarbon, alkoxy groups, and mixtures thereof,
   wherein at least one of $R^1$, $R^2$, $R^3$, and $R^4$ comprises an alkoxy group selected from the group consisting of methoxy, ethoxy, propoxy, butoxy, pentoxy, and mixtures thereof,
   wherein said functional group forms a terminal group on said polymer and further wherein the polymer has a 1,2-microstructure content of about 40-70%, a weight average molecular weight ($M_w$) of about 10,000-60,000 and a polydispersity of less than about 1.8.

2. The composition of claim 1 wherein said conjugated diene contributed monomer units are selected from the group consisting of 1,3-butadiene, isoprene, 1,3-pentadiene, 2,3-dimethyl-1,3-butadiene, 1,3-hexadiene, 2-methyl-1,3-pentadiene, 3,4-dimethyl-1,3-hexadiene, 4,5-diethyl-1,3-octadiene, 3-butyl-1,3-octadiene, phenyl-1,3-butadiene, and mixtures thereof.

3. The composition of claim 1, wherein the polymer backbone further includes additional monomer units selected from the group consisting of vinyl aromatic hydrocarbon monomers, ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isbutyrthioaldehyde, n-caprothioaldehyde, 3-dimethyl-oxycyclobutane, 3-diethyloxycyclobutane, 3-methylethyl-oxycyclobutane, 3-diemethylthiocycylobutane, 3-diethyl-thiocyclobutane, 3-methylethyithiocyclobutane, methylethyl thioketone, methyl isopropyl thioketone and diethyl thioketone, heterocyclic nitrogen containing monomers, and mixtures thereof.

4. The composition of claim 1 wherein said polymer backbone further includes at least one initiator residue.

5. The composition of claim 4 wherein said initiator residue is derived from a multi-functional initiator.

6. The composition of claim 1 wherein said hydrocarbon group(s) are selected from the group consisting of methyl, ethyl, propyl, butyl, pentyl-, hexyl-, heptyl-, octyl-, nonyl-, decyl-, and mixtures thereof.

7. The composition of claim 1, further comprising one or more randomizing modifiers to control the 1,2-microstructure content of the composition.

8. The composition of claim 7, wherein the one or more randomizing modifiers is selected from the group consisting of hexamethyiphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydorfuran, 1,4-diazabicyclo octane, diethyl ether, triethylamine, tri-n-butylamine, tri-n-butylphosphine, p-dioxane, 1,2-dimethoxy ethane, dimethyl ether, methyl ethyl ether, di-n-propyl ether, di-n-octyl ether, anisole, dibenzyl ether, dimethyl aniline, N-ethylpiperidine, N-methyl-N-ethyl aniline, N-methylmorpholine tetramethylenediamine, oligomeric oxolanyl propanes (QOPS), 2,2-bis-(4-methyl dioxane), bistetrahydrofuryl propane and mixtures thereof.

9. The composition of claim 1, wherein the weight average molecular weight or ($M_w$) is between 10,000 and 35,000.

10. The composition of claim 1, further comprising one or more additional sealant ingredients selected from the group consisting of plasticizers, fillers, reinforcing agents, modifiers, curing catalysts/hardeners, stabilizers, and mixtures thereof.

11. The composition of claim 1, wherein said sealant is curable upon exposure to moisture.

12. A process for forming a curable sealant comprising:
   a) forming a polymer having a 1,2-microstructure content of about 40-70%, a weight average molecular weight ($M_w$) of about 10,000-60,000, and a polydispersity of less than 1.8 by
      i) initiating a living polymerization of conjugated diene monomers with a multi-functional initiator present in an amount of about 0.001 to 0.1 moles per 100 grams conjugated diene monomer, and
      ii) terminating said polymerization with a tetra-substituted silicon containing functional group of the structure:

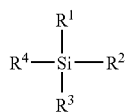

to produce a polymer having a terminal silicon-containing group, wherein $R^1$, $R^2$, $R^3$, and $R^4$ are independently selected from the group consisting of hydrocarbon, alkoxy groups, and mixtures thereof, wherein at least one of $R^1$, $R^2$, $R^3$, and $R^4$ comprises an alkoxy group selected from the group consisting of methoxy, ethoxy, propoxy, butoxy, pentoxy, and mixtures thereof, and b) combining the polymer having a terminal silicon-containing group with one or more sealant ingredients selected from the group consisting of plasticizers, fillers, reinforcing agents, modifiers, curing catalysts/hardeners, stabilizers, and mixtures thereof.

13. The process of claim 12 wherein said conjugated diene monomers are selected from the group consisting of 1,3-butadiene, isoprene, 1,3-pentadiene, 2,3-dimethyl-1,3-butadiene, 1,3-hexadiene, 2-methyl-1,3-pentadiene, 3,4-dimethyl-1,3-hexadiene 4,5-diethyl-1,3-octadiene, 3-butyl-1,3-octadiene phenyl-1,3-butadiene, and mixtures thereof.

14. The process of claim 12 wherein said living polymerization includes additional monomer units.

15. The process of claim 14 wherein said additional monomer units are selected from the group consisting of vinyl aromatic hydrocarbon monomers, ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isbutyrthioaldehyde, n-caprothioaldehyde, 3-dimethyloxycyclobutane, 3-diethyloxycyclobutane, 3-methylethyloxycyclobutane, 3-diemethylthiocycylobutane, 3-diethylthiocyclobutane, 3-methylethylthiocyclobutane, methylethylthioketone, methyl isopropyl thioketone and diethyl thioketone, heterocyclic nitrogen containing monomers, and mixtures thereof.

16. The process of claim 12 wherein said hydrocarbon groups are selected from the group consisting of methyl, ethyl, propyl, butyl, pentyl-, hexyl-, heptyl-octyl, nonyl-, decyl-, and mixtures thereof.

17. The process of claim 12, wherein the polymer has a weight average molecular weight of about 10,000-35,000.

* * * * *